US012303965B2

(12) United States Patent  (10) Patent No.: US 12,303,965 B2
Palfreman et al.  (45) Date of Patent: May 20, 2025

(54) METHOD OF AUTOMATING AND OPTIMIZING COIL FORMATION IN A WIRE ROD LINE COOLING CONVEYOR

(71) Applicant: Primetals Technologies USA LLC, Alpharetta, GA (US)

(72) Inventors: Matthew D. Palfreman, Charlton, MA (US); Jason Zelle, Worcester, MA (US); Margaret Gentile, Shrewsbury, MA (US)

(73) Assignee: Primetals Technologies USA LLC, Alpharetta, GA (US)

( * ) Notice: Subject to any disclaimer, the term of this patent is extended or adjusted under 35 U.S.C. 154(b) by 443 days.

(21) Appl. No.: 17/711,244

(22) Filed: Apr. 1, 2022

(65) Prior Publication Data

US 2023/0311195 A1    Oct. 5, 2023

(51) Int. Cl.
*B21F 23/00*    (2006.01)
*B21F 3/02*    (2006.01)
*G05B 19/416*    (2006.01)

(52) U.S. Cl.
CPC ............ *B21F 23/00* (2013.01); *B21F 3/02* (2013.01); *G05B 19/416* (2013.01)

(58) Field of Classification Search
None
See application file for complete search history.

(56) References Cited

PUBLICATIONS

Morales, R. D., A. G. Lopéz, and I. M. Olivares. "Mathematical simulation of Stelmor process." Ironmak. Steelmak 18 (1991): 128-138. (Year: 1991).*
Denkena, Berend, Carsten Schmidt, and Patricc Weber. "Automated fiber placement head for manufacturing of innovative aerospace stiffening structures." Procedia Manufacturing 6 (2016): 96-104. (Year: 2016).*
Jain, Ishant, et al. "An approach to heat transfer analysis of wire loops over the stelmor conveyor to predict the microstructural and mechanical attributes of steel rods." Journal of Thermal Science and Engineering Applications 8.2 (2016): 021019. (Year: 2016).*
Hwang, Joong-Ki. "The temperature distribution and underlying cooling mechanism of steel wire rod in the Stelmor type cooling process." Applied Thermal Engineering 142 (2018): 311-320. (Year: 2018).*

(Continued)

*Primary Examiner* — Carlos R Ortiz Rodriguez
(74) *Attorney, Agent, or Firm* — Gesmer Updegrove LLP

(57) ABSTRACT

Disclosed is a system for automating and optimizing coil formation in a wire rod cooling conveyor comprising: (a) a speed measuring device (e.g., a laser velocometer) measuring a speed of a material entering a laying head; (b) a processor that: (1) receives, as input, the speed measured in (a), (2) computes an optimal speed of the laying head based on the received speed of the material entering the laying head; and wherein the processor dynamically computes the optimal speed of the laying head as the speed of the material changes. Also disclosed is a camera that monitors actual ring formation on the wire rod cooling conveyor at an exit point of the laying head, wherein the processor receives such monitored information from the camera and outputs a control signal to override the speed measuring device and to adjust a speed of the wire rod cooling conveyor.

20 Claims, 7 Drawing Sheets

(56) References Cited

PUBLICATIONS

Yao, Shuangji, et al. "Force analysis and curve design for laying pipe in loop laying head of wire rod mills." Chinese Journal of Mechanical Engineering 32 (2019): 1-17. (Year: 2019).*
Schindler, Ivo, Stanislav Rusz, and Tomáš Kubina. "Rolling." CAI 2.2 (2015): 2-2. (Year: 2019).*

* cited by examiner

METHOD OF AUTOMATING AND OPTIMIZING COIL FORMATION IN A WIRE ROD LINE COOLING CONVEYOR

BACKGROUND OF THE INVENTION

Field of Invention

The present invention relates generally to the field of coil formation in a wire rod line. More specifically, the present invention is related to a system and method for automating and optimizing coil formation in a wire rod line cooling conveyor.

Discussion of Prior Art

The rings formed in the laying head of a wire rod line are critical to key aspects of the final materials' metallurgical and mechanical properties, and the suitability of the coil for further processing such as de-scaling, patterning, and drawing. The control of the machine that creates the rings known as the "laying head" receives a speed reference from the level 1 mill control to set its speed correctly. However, manual trimming above and below this speed is required to ensure the rings are formed correctly due to factors that the level 1 mill automation cannot control or adjust. For example, if the same size product is being rolled, but the temperature of the material changes, the actual speed of the wire in the mill being processed will change as a result. This will result in the rings being formed at the laying head to move out of position or to be formed incorrectly. An operator must then manually trim the speed of the "laying head" to correct this. The intent of this invention is to remove the need for such manual intervention and to fully automate the control and trim of the laying head resulting in optimized coil formation from the laying head to the cooling conveyor.

The current state of the art, as explained earlier, is to take a speed reference from the level 1 mill system. This value is a calculated speed value from the overall reductions made as the wire is processed, "R" value of each stand, and the motor rpms of the stand. The calculation then derives the speed of the wire being processed. Such calculation is typically only accurate within +/−3%. The calculation does not take into account that different materials react differently to the rolling process changing the product speed for a set of given reductions and it does not take into account that the processing temperature of the wire has an effect on its speed in the line. As such, an operator constantly monitors the pattern at the laying head to make manual trim adjustments to the process.

Whatever the precise merits, features, and advantages of the above cited references, none of them achieves or fulfills the purposes of the present invention.

SUMMARY OF THE INVENTION

In one embodiment, the present invention provides a system for automating and optimizing coil formation in a wire rod cooling conveyor comprising: (a) a speed measuring device measuring a speed of a material entering a laying head; (b) a processor that: (1) receives, as input, the speed measured in (a), (2) computes an optimal speed of the laying head based on the received speed of the material entering the laying head; and wherein the processor dynamically computes the optimal speed of the laying head as the speed of the material changes.

In another embodiment, the present invention provides a system for automating and optimizing coil formation in a wire rod cooling conveyor comprising: (a) a speed measuring device measuring a speed of a material entering a laying head; (b) a processor that: (1) receives, as input, the speed measured in (a), (2) computes an optimal speed of the laying head based on the received speed of the material entering the laying head, wherein the optimal speed of the laying head is a function of the following parameters: the speed of the material entering the laying head, a laying head ring diameter, and a gear ratio associated with the laying head; and wherein the processor dynamically computes the optimal speed of the laying head as the speed of the material changes.

In yet another embodiment, the present invention provides a method as implemented by a processor configured to automate and optimize coil formation in a wire rod cooling conveyor, the method comprising: (a) receiving a speed of a material entering a laying head as measured by a speed measuring device; (b) computing an optimal speed of the laying head as a function of the following parameters: the speed of the material entering the laying head, a laying head ring diameter, and a gear ratio associated with the laying head; and (c) outputting one more instructions based on the computed optimal speed to a motor associated with the laying head to match the speed of the material entering the laying head, wherein the processor dynamically computes the optimal speed of the laying head as the speed of the material changes.

In another embodiment, the present invention provides a method as implemented by a processor configured to automate and optimize coil formation in a wire rod cooling conveyor, the method comprising: (a) receiving a speed of a material entering a laying head as measured by a speed measuring device; (b) computing an optimal speed of the laying head as a function of the following parameters: the speed of the material entering the laying head, a laying head ring diameter, and a gear ratio associated with the laying head; (c) outputting one more instructions based on the computed optimal speed to a motor associated with the laying head to match the speed of the material entering the laying head, wherein the processor dynamically computes the optimal speed of the laying head as the speed of the material changes; (d) receiving a feedback input from a camera monitoring indicating a coil pattern is not central; and (e) incrementally adjusting the optimal speed by a pre-determined amount until the feedback input from the camera indicates that the coil pattern is central.

In another embodiment, the present invention provides a system for automating and optimizing coil formation in a wire rod cooling conveyor comprising: (a) a speed measuring device measuring a speed of a material entering a laying head; (b) a processor that: (1) receives, as input, the speed measured in (a), (2) computes an optimal speed of the laying head based on the received speed of the material entering the laying head; wherein the processor dynamically computes the optimal speed of the laying head as the speed of the material changes; and (c) a camera, the camera monitoring actual ring formation on the wire rod cooling conveyor at an exit point of the laying head and outputting a feedback signal to the processor when a coil pattern is not central; and wherein the processor incrementally adjusts the optimal speed by a pre-determined amount until the feedback signal from the camera indicates that the coil pattern is central.

BRIEF DESCRIPTION OF THE DRAWINGS

The present disclosure, in accordance with one or more various examples, is described in detail with reference to the following figures. The drawings are provided for purposes of illustration only and merely depict examples of the disclosure. These drawings are provided to facilitate the reader's understanding of the disclosure and should not be considered limiting of the breadth, scope, or applicability of the disclosure. It should be noted that for clarity and ease of illustration these drawings are not necessarily made to scale.

DESCRIPTION OF THE PREFERRED EMBODIMENTS

Figure 1:
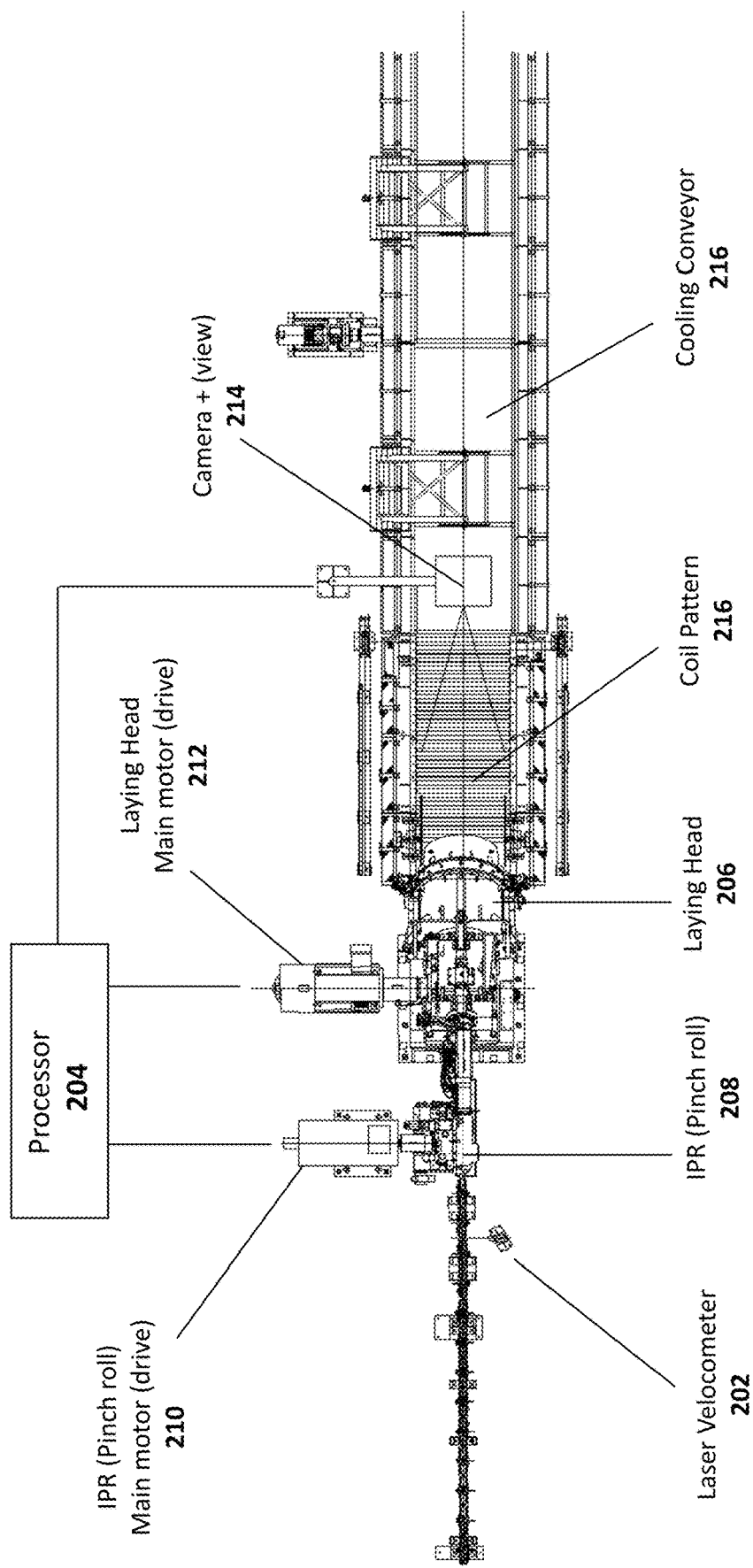
FIG. 1 illustrates a system of the present invention for automating and optimizing coil formation in a wire rod line.
Figure 2A:
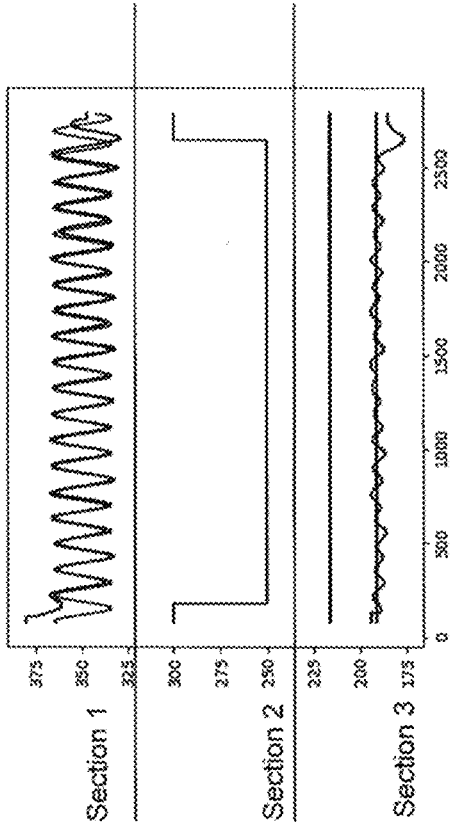
FIGS. 2A-F illustrate an output of a computer that processes the input from the camera shown in FIG. 1.
Figure 2B:
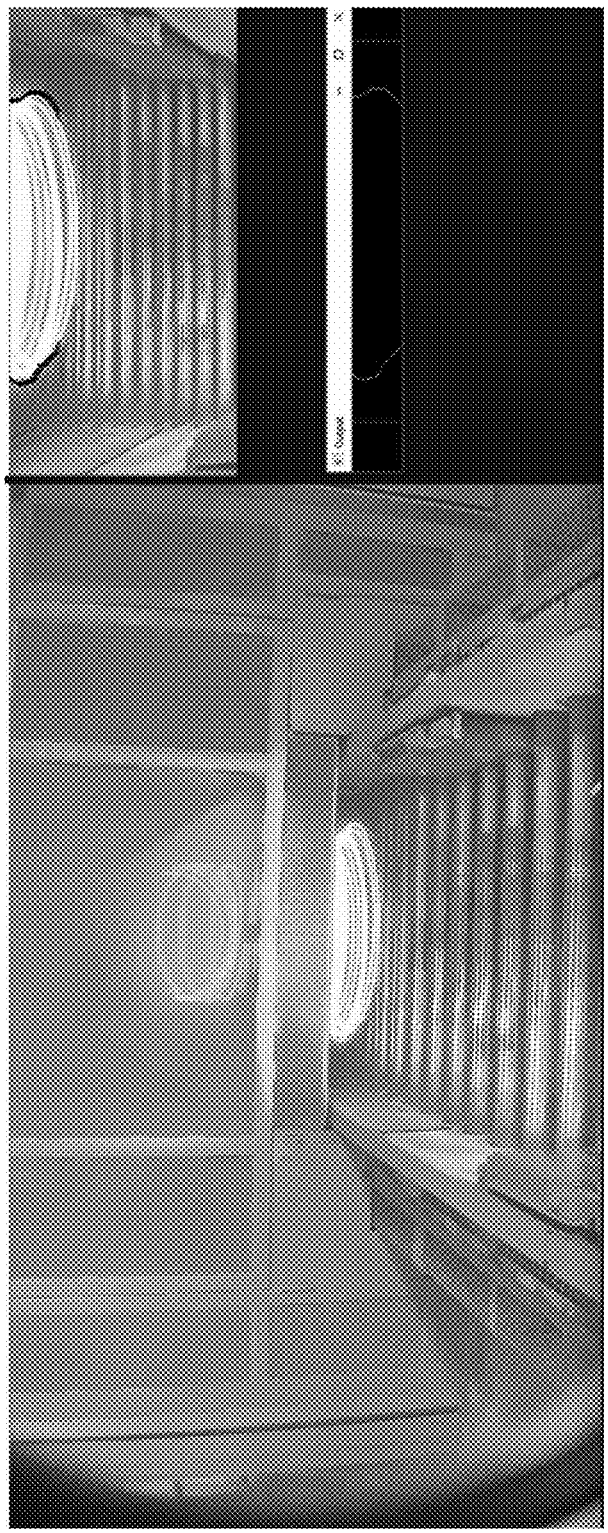
Figure 2C:
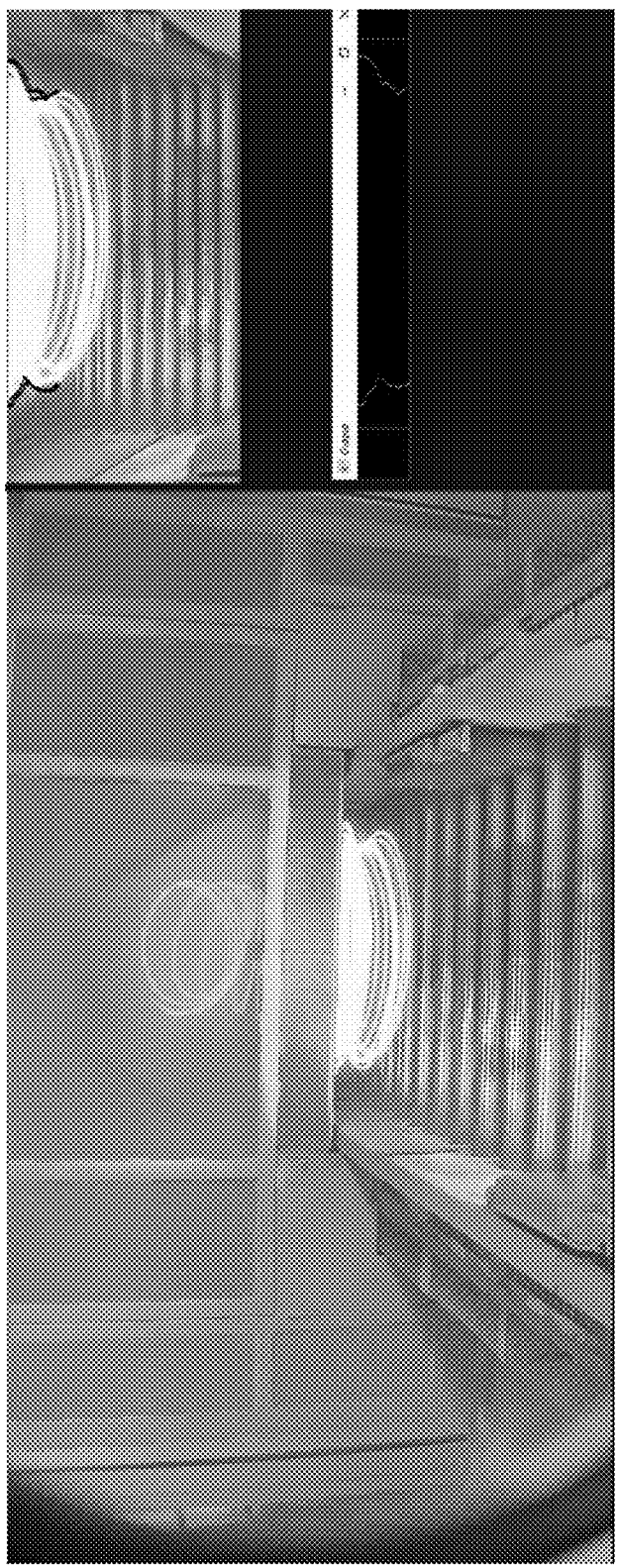
Figure 2D:
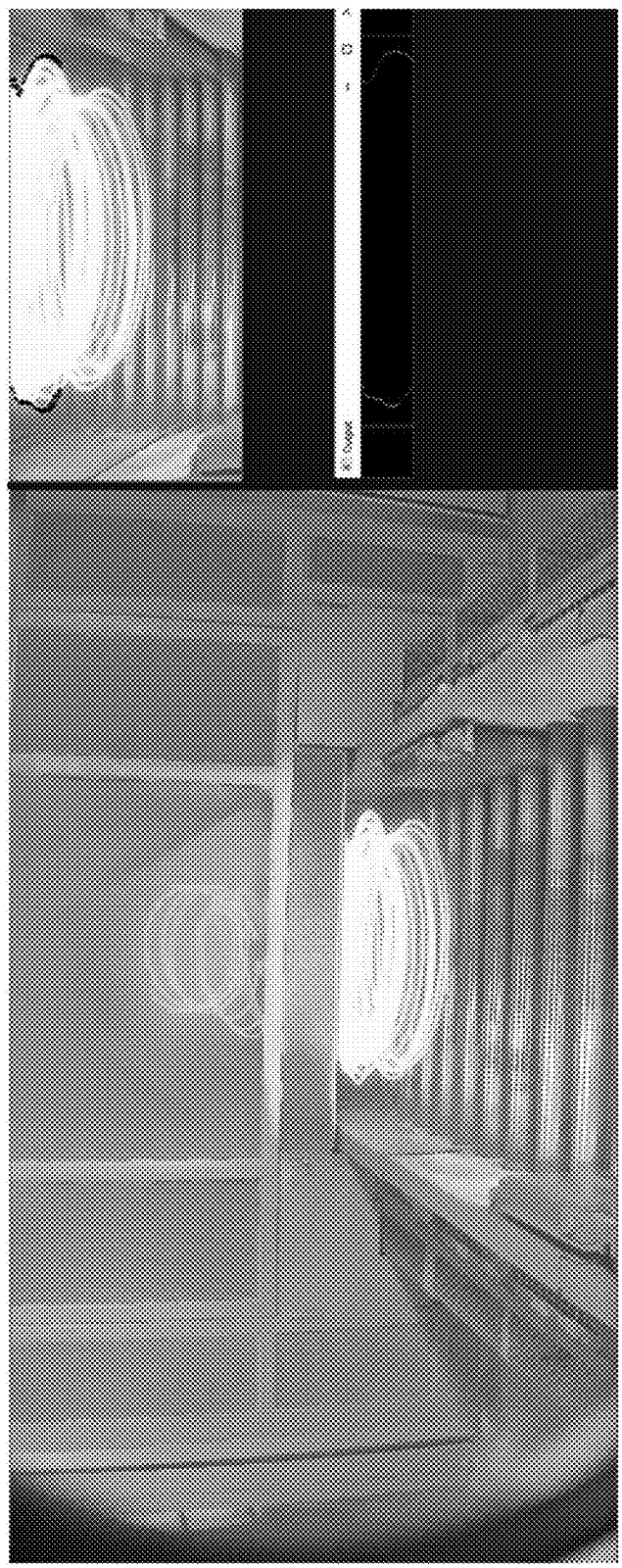
Figure 2E:
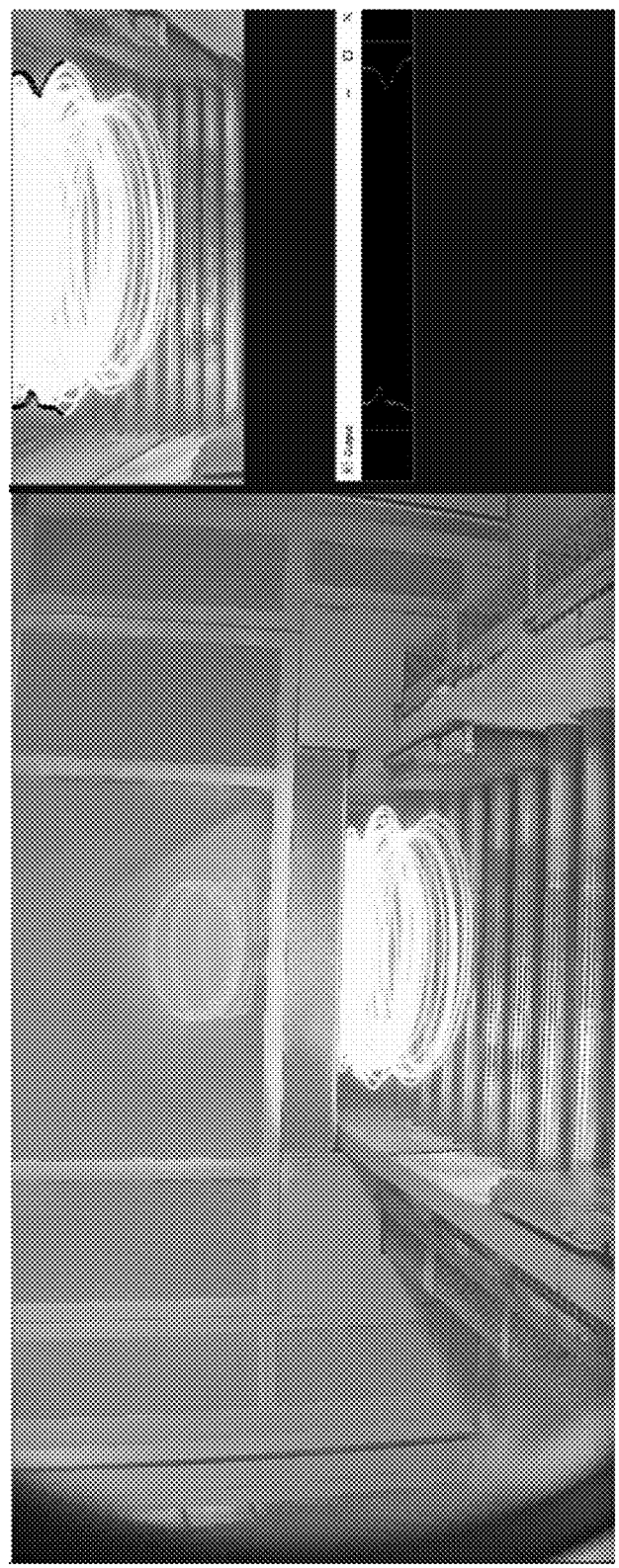
Figure 2F:
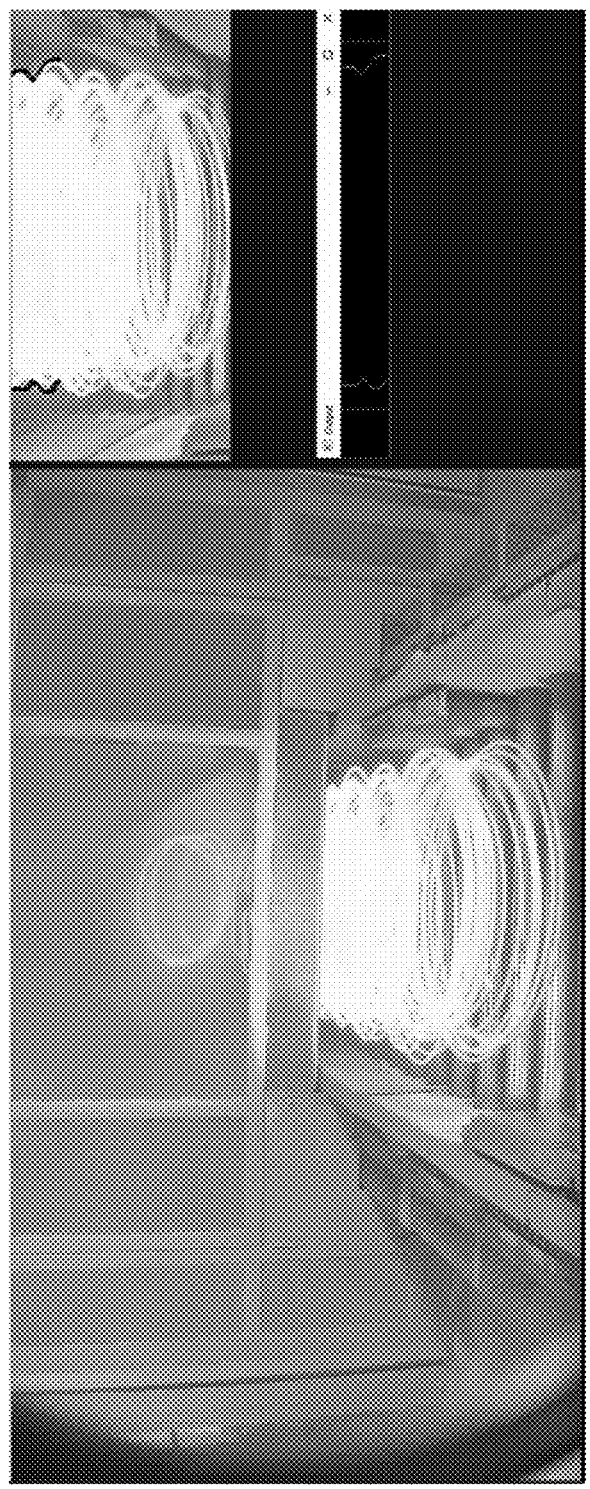

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

In the prior art, the automation of the laying head is not dynamic. It uses simple speed references and ramp rates to adjust speed for certain modes of operation, such as, tail end speed up for large products, and tail end slow down for small high-speed products. There is no actual material speed feedback to the machine and no actual feedback to the machines with respect to the coils it is creating and presenting to the cooling conveyor. The current state of the art is to adjust for this with an experienced operator.

FIG. 1 depicts an exemplary embodiment of the system of the present invention as implemented in a wire rod line. The system as shown comprises a laser velocometer 202, a processor 204, LH 206, IPR 208, IPR main drive 210, LH main drive 212, camera 214, cooling conveyor 216, and pattern (coil) 218. Laser velocometer 202 is a speed measurement device. Processor 204 processes the image data and communicates with the drives for the IPR and Laying head to adjust the rings (pattern) from the laying head. Laying head 206 creates the rings and deposits them on the conveyor. Pinch roll (IPR) 208 controls the rings (pattern) in conjunction with the laying head 206. Pinch roll (IPR) main motor 210 and drive control the pinch roll speeds. Laying head main motor and drive 212 controls the laying head 206 speed. Camera 214 captures images to be processed by the processor 204. Cooling conveyor 216 carries the rings and cools them as needed. Pattern 218 is the shape of the rings as presented to the cooling conveyor 216 for cooling.

The present invention solves the aforementioned problem with the prior art with two distinct approaches.

1. A laser velocometer is utilized to measure the true speed of the material as it enters the "laying head". In a non-limiting example, the laser velocometer can measure speeds from 5 m/s to 130 m/s. This laser velocometer signal is then used to calculate the optimum speed of the laying head. The control is dynamic so that as the speed of the material changes (as it is being produced), the speed of the laying head is kept at the correct setpoint to optimum coil formation. This method is used throughout the length of the wire being rolled to ensure a consistent operation. In one non-limiting example, the optimum speed of the laying head may be calculated as follows: (material incoming speed (m/s)/(laying head mean ring diameter (m)×π)). This gives the rev/s required of the laying head. This is multiplied by the gearbox ratio driving the laying head so the motor rpm needed is derived to match the product speed of the material in the mill line.

2. A camera system monitors the actual ring formation presented on the cooling conveyor at the exit of the laying head, this control is used as an override to the laser velocometer and to adjust the cooling conveyor speed as needed. In a non-limiting example, the camera (and enclosure for the camera) are picked to withstand the operating conditions of a wire rod mill with the frame rate of such a camera exceeding 240 fps. The pattern is monitored via the camera system and is typically done visually by an operator viewing the camera output, where the speed of the laying head is adjusted from the control desk. As an example, if an adjustment to the product size is made during rolling, the speed of the product changes. The current state-of-the-art laying head does not see this change of speed (as nothing is measuring it), and so the rings formed at the laying head will move either left or right as they exit the laying head. The movement of the rings is detrimental to cooling of the rings on the conveyor as they need to be kept central.

The override is required to ensure that the rings presented to the cooling conveyor are central (central in this case is that the center line of each ring layed is aligned with the center line of the conveyor+/−x mm this is required to ensure the correct cooling is applied from the conveyor and the correct tensile values of the finished product are achieved) and that the rings are spaced at the correct intervals with respect to each other; this is a requirement to ensure optimal and uniform cooling of the rings. The camera relays the real-time image of the coil formation to a simple PC that then runs the appropriate software and measures/traces the desired variables such as ring spacing, the location of the rings relative to the center line of the cooling conveyor and the overall shape of the coil as it is being formed on the conveyor. The results from the software are then used to adjust the speed of the laying head and the cooling conveyor. As a non-limiting example, the mill speed is set to 100 m/s, the laying head laser is reading 102 m/s, and the pattern is central on the conveyor. For a reason unknown the product speed is measured now at 105 m/s. Using the following formula, the speed of the laying head can be adjusted as follows: (product speed/(laying head mean ring diameter× π))×gear ratio of the laying head. This computation is used to adjust the main drive motor to the correct speed. If for some reason the camera detects the pattern not to be central on the conveyor by the camera the speed is incrementally adjusted by 0.2%/s until it is verified as central. For certain modes of operation, such as tail-end control, the pinch roll before the laying head will also be controlled adjusted by the results from the camera but these results or adjustments will be iterative, and any correction would be applied to the following coil as the process is too fast for dynamic control. The IPR (i.e., pinch roll) is used to control the tail formation of the ring as it slows, holds, or increases the speed of the last ring depending on the product size to ensure it is formed to the correct size and placed centrally on the conveyor in line with the remainder of the coil. If the speed of the material as it exits the laying head is incorrect the rings will shift left or right or be formed too large or too small. To control the size of the rings, the pinch roll speed is matched relative to the speed of the product in the mill, and it either accelerates or decelerates the material to the desired setpoint as the end of the material approaches the laying head.

An interface to the mills level 1 system that controls the speed of the following items of equipment: laying head, laying head pinch roll, cooling conveyor entry zone speed.

FIGS. 2A-F depicts the software running on the PC which monitors the formed coil.

It may be possible to remove the laser from the control system. That is, while a laser may be used, it should be noted that one could also rely on the camera feedback only of the pattern on the conveyor.

It may also be possible to substitute the camera with a thermal camera to monitor the temperature of the coil as it is formed.

The invention is intended to be a real-time monitor of the process, that can make on-the-fly adjustments to the process.

Advantages of the present invention include (but are not limited to): improved final wire rod quality from the plant, increased operational life of the wear parts, guides associated with the equipment, reduced operator input, a standardized and repeatable approach to the control of the equipment and process, reduced scrap from incorrect setup and operation, and reduced customer complaints.

In one embodiment, the present invention provides a system for automating and optimizing coil formation in a wire rod cooling conveyor comprising: (a) a speed measuring device measuring a speed of a material entering a laying head; (b) a processor that: (1) receives, as input, the speed measured in (a), (2) computes an optimal speed of the laying head based on the received speed of the material entering the laying head; and wherein the processor dynamically computes the optimal speed of the laying head as the speed of the material changes.

In another embodiment, the present invention provides a system for automating and optimizing coil formation in a wire rod cooling conveyor comprising: (a) a speed measuring device measuring a speed of a material entering a laying head; (b) a processor that: (1) receives, as input, the speed measured in (a), (2) computes an optimal speed of the laying head based on the received speed of the material entering the laying head, wherein the optimal speed of the laying head is a function of the following parameters: the speed of the material entering the laying head, a laying head ring diameter, and a gear ratio associated with the laying head; and wherein the processor dynamically computes the optimal speed of the laying head as the speed of the material changes.

In yet another embodiment, the present invention provides a method as implemented by a processor configured to automate and optimize coil formation in a wire rod cooling conveyor, the method comprising: (a) receiving a speed of a material entering a laying head as measured by a speed measuring device; (b) computing an optimal speed of the laying head as a function of the following parameters: the speed of the material entering the laying head, a laying head ring diameter, and a gear ratio associated with the laying head; and (c) outputting one more instructions based on the computed optimal speed to a motor associated with the laying head to match the speed of the material entering the laying head, wherein the processor dynamically computes the optimal speed of the laying head as the speed of the material changes.

In another embodiment, the present invention provides a method as implemented by a processor configured to automate and optimize coil formation in a wire rod cooling conveyor, the method comprising: (a) receiving a speed of a material entering a laying head as measured by a speed measuring device; (b) computing an optimal speed of the laying head as a function of the following parameters: the speed of the material entering the laying head, a laying head ring diameter, and a gear ratio associated with the laying head; (c) outputting one more instructions based on the computed optimal speed to a motor associated with the laying head to match the speed of the material entering the laying head, wherein the processor dynamically computes the optimal speed of the laying head as the speed of the material changes; (d) receiving a feedback input from a camera monitoring indicating a coil pattern is not central; and (e) incrementally adjusting the optimal speed by a pre-determined amount until the feedback input from the camera indicates that the coil pattern is central.

In another embodiment, the present invention provides a system for automating and optimizing coil formation in a wire rod cooling conveyor comprising: (a) a speed measuring device measuring a speed of a material entering a laying head; (b) a processor that: (1) receives, as input, the speed measured in (a), (2) computes an optimal speed of the laying head based on the received speed of the material entering the laying head; wherein the processor dynamically computes the optimal speed of the laying head as the speed of the material changes; and (c) a camera, the camera monitoring actual ring formation on the wire rod cooling conveyor at an exit point of the laying head and outputting a feedback signal to the processor when a coil pattern is not central; and wherein the processor incrementally adjusts the optimal speed by a pre-determined amount until the feedback signal from the camera indicates that the coil pattern is central.

CONCLUSION

A system and method have been shown in the above embodiments for the effective implementation of a method of automating and optimizing coil formation in a wire rod line cooling conveyor. While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by size, materials, or specific manufacturing techniques.

The invention claimed is:

1. A system for automating and optimizing coil formation in a wire rod cooling conveyor comprising:
   (a) a speed measuring device measuring a speed of a material entering a laying head;
   (b) a processor that: (1) receives, as input, the speed measured in (a), (2) computes an optimal speed of the laying head based on the received speed of the material entering the laying head, wherein the optimal speed of the laying head is a function of the following parameters: the speed of the material entering the laying head, a laying head ring diameter, and a gear ratio associated with the laying head;
   wherein said processor outputs one or more instructions based on the computed optimal speed to a motor associated with the laying head to match the speed of the material entering the laying head; and
   wherein the processor dynamically computes the optimal speed of the laying head as the speed of the material changes.

2. The system of claim 1, wherein the processor dynamically computes the optimal speed as follows: (the speed of the material entering the laying head/(the laying head ring diameter*$\pi$))*the gear ratio associated with the laying head).

3. The system of claim 1, wherein the speed measuring device is a laser velocometer.

4. The system of claim 3, wherein the laser velocometer is configured to measure speeds from 5 m/s to 130 m/s.

5. The system of claim 1, wherein consistent operation of the wire rod cooling conveyor is ensured via computing the optimal speed of the laying head throughout a length of a wire being rolled.

6. The system of claim 1, wherein the system further comprising:
   (c) a camera, the camera monitoring actual ring formation on the wire rod cooling conveyor at an exit point of the laying head,
   wherein the processor receiving monitored information from the camera and outputting a control signal to override the speed measuring device and to adjust a speed of the wire rod cooling conveyor.

7. The system of claim 6, wherein the camera and an enclosure for the camera are picked to withstand operating conditions of a wire rod mill.

8. The system of claim 7, wherein the camera is picked to have a frame rate exceeding 240 fps.

9. A method as implemented by a processor configured to automate and optimize coil formation in a wire rod cooling conveyor, the method comprising:
   (a) receiving a speed of a material entering a laying head as measured by a speed measuring device;
   (b) computing an optimal speed of the laying head as a function of the following parameters: the speed of the material entering the laying head, a laying head ring diameter, and a gear ratio associated with the laying head; and
   (c) outputting one or more instructions based on the computed optimal speed to a motor associated with the laying head to match the speed of the material entering the laying head, wherein the processor dynamically computes the optimal speed of the laying head as the speed of the material changes.

10. The method of claim 9, wherein the processor dynamically computes the optimal speed as follows: (the speed of the material entering the laying head/(the laying head ring diameter*π))*the gear ratio associated with the laying head).

11. The method of claim 9, wherein the speed measuring device is a laser velocometer.

12. The method of claim 9, wherein the method further comprising monitoring, via a camera, actual ring formation on the wire rod cooling conveyor at an exit point of the laying head, the processor receiving monitored information from the camera and outputting a control signal to override the speed measuring device and to adjust a speed of the wire rod cooling conveyor.

13. A method as implemented by a processor configured to automate and optimize coil formation in a wire rod cooling conveyor, the method comprising:
   (a) receiving a speed of a material entering a laying head as measured by a speed measuring device;
   (b) computing an optimal speed of the laying head as a function of the following parameters: the speed of the material entering the laying head, a laying head ring diameter, and a gear ratio associated with the laying head;
   (c) outputting one or more instructions based on the computed optimal speed to a motor associated with the laying head to match the speed of the material entering the laying head, wherein the processor dynamically computes the optimal speed of the laying head as the speed of the material changes;
   (d) receiving a feedback input from a camera monitoring indicating a coil pattern is not central; and
   (e) incrementally adjusting the optimal speed by a pre-determined amount until the feedback input from the camera indicates that the coil pattern is central.

14. The method of claim 13, wherein the speed measuring device is a laser velocometer.

15. The method of claim 13, wherein the optimal speed is computed as follows: (the speed of the material entering the laying head/(the laying head ring diameter*π))*the gear ratio associated with the laying head).

16. The method of claim 13, wherein the predetermined amount is 0.2%.

17. A system for automating and optimizing coil formation in a wire rod cooling conveyor comprising:
   (a) a speed measuring device measuring a speed of a material entering a laying head;
   (b) a processor that: (1) receives, as input, the speed measured in (a), (2) computes an optimal speed of the laying head based on the received speed of the material entering the laying head; wherein the processor dynamically computes the optimal speed of the laying head as the speed of the material changes; and
   (c) a camera, the camera monitoring actual ring formation on the wire rod cooling conveyor at an exit point of the laying head and outputting a feedback signal to the processor when a coil pattern is not central; and
   wherein the processor incrementally adjusts the optimal speed by a pre-determined amount until the feedback signal from the camera indicates that the coil pattern is central.

18. The method of claim 17, wherein the speed measuring device is a laser velocometer.

19. The method of claim 17, wherein the optimal speed is computed as follows: (the speed of the material entering the laying head/(the laying head ring diameter*π))*the gear ratio associated with the laying head).

20. The method of claim 17, wherein the predetermined amount is 0.2%.

* * * * *